(12) United States Patent
Ho et al.

(10) Patent No.: US 8,025,471 B2
(45) Date of Patent: Sep. 27, 2011

(54) CONNECTING ELEMENT

(75) Inventors: Yen-Tsang Ho, Taipei Hsien (TW); Bin Tu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 371 days.

(21) Appl. No.: 12/343,497

(22) Filed: Dec. 24, 2008

(65) Prior Publication Data

US 2010/0098512 A1    Apr. 22, 2010

(30) Foreign Application Priority Data

Oct. 20, 2008 (CN) ................. 2008 2 0302494 U

(51) Int. Cl.
*F16B 35/06* (2006.01)

(52) U.S. Cl. .................. 411/180; 411/188; 411/107

(58) Field of Classification Search .................. 411/179, 411/180, 501, 176, 187, 188, 107, 399, 408
See application file for complete search history.

(56) References Cited

U.S. PATENT DOCUMENTS

| | | | | |
|---|---|---|---|---|
| 3,000,420 A * | 9/1961 | Spokes | | 411/180 |
| 3,079,970 A * | 3/1963 | Barry | | 411/113 |
| 3,242,962 A * | 3/1966 | Dupree | | 411/180 |
| 3,276,499 A * | 10/1966 | Reusser | | 411/179 |
| 3,443,617 A * | 5/1969 | Whiteside et al. | | 411/180 |
| 3,820,579 A * | 6/1974 | Barry | | 411/176 |
| 4,046,181 A * | 9/1977 | Barnsdale | | 411/180 |
| 4,370,794 A * | 2/1983 | Bien et al. | | 29/509 |
| 6,108,893 A * | 8/2000 | Wojciechowski et al. | | 29/505 |
| 6,527,489 B2 * | 3/2003 | Kando | | 411/107 |
| 6,722,013 B1 * | 4/2004 | Rapp | | 29/521 |
| 7,374,382 B2 * | 5/2008 | Bentrim | | 411/180 |
| 2002/0054806 A1 * | 5/2002 | Sakamura et al. | | 411/180 |
| 2009/0304477 A1 * | 12/2009 | Dai | | 411/180 |
| 2010/0129174 A1 * | 5/2010 | Maloney | | 411/180 |

* cited by examiner

*Primary Examiner* — Flemming Saether
(74) *Attorney, Agent, or Firm* — Altis Law Group, Inc.

(57) ABSTRACT

A connecting element includes a tapered head, a shaft, and a neck portion connected between the head and the shaft. A circumference of the head decreases towards the neck portion to form a slanted guiding portion functioning as a slanted guiding portion. The shaft includes a resisting portion facing and connecting with the neck portion. The guiding portion, the neck portion, and the resisting portion corporately form a slot.

5 Claims, 2 Drawing Sheets

CONNECTING ELEMENT

BACKGROUND

1. Technical Field

The present disclosure relates to connecting elements and, particularly, to a connecting element utilized for connecting two objects.

2. Description of Related Art

Generally, a connecting element is often used to joint two objects each defining a through hole. The connecting element generally includes a head and a shaft. A U-shaped slot is defined in the shaft adjacent the head. Two sides of the slot are parallel to the head and a free end of the shaft. In use, the shaft of the connecting element is inserted into the through hole of one of the objects. The head of the connecting element is punched into the through hole, with a part bounding the through hole of the object deforming to be squeezed into the slot. Thus, the head of the connecting element is fixed to the object. The shaft of the connecting member is engaged in the through hole of the other object to join the two objects together. However, the object fixing the connecting element may be damaged when the object is overly deformable. Moreover, great stress may be formed in the slot, resulting in rupturing the connecting element from the slot.

DETAILED DESCRIPTION

Figure 1:
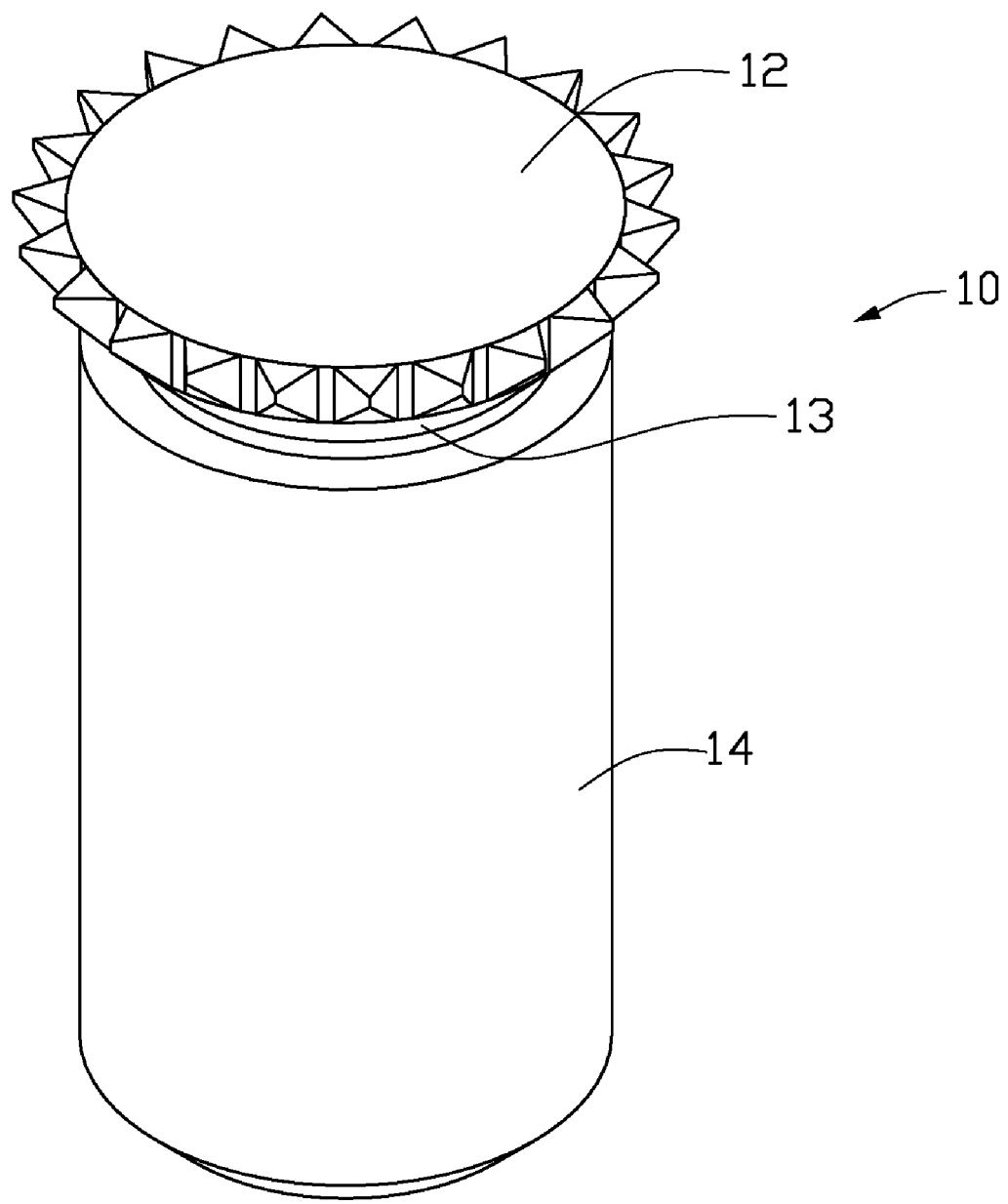
FIG. 1 is an isometric view of an exemplary embodiment of a connecting element.

Referring to FIG. 1, an exemplary embodiment of a connecting element 10 is used for connecting two objects (not shown). The connecting element 10 includes a head 12, a shaft 14, and a neck portion 13 connected between the head 12 and the shaft 14. A diameter of the neck portion 13 is smaller than that of each of the head 12 and shaft 14.

Figure 2:
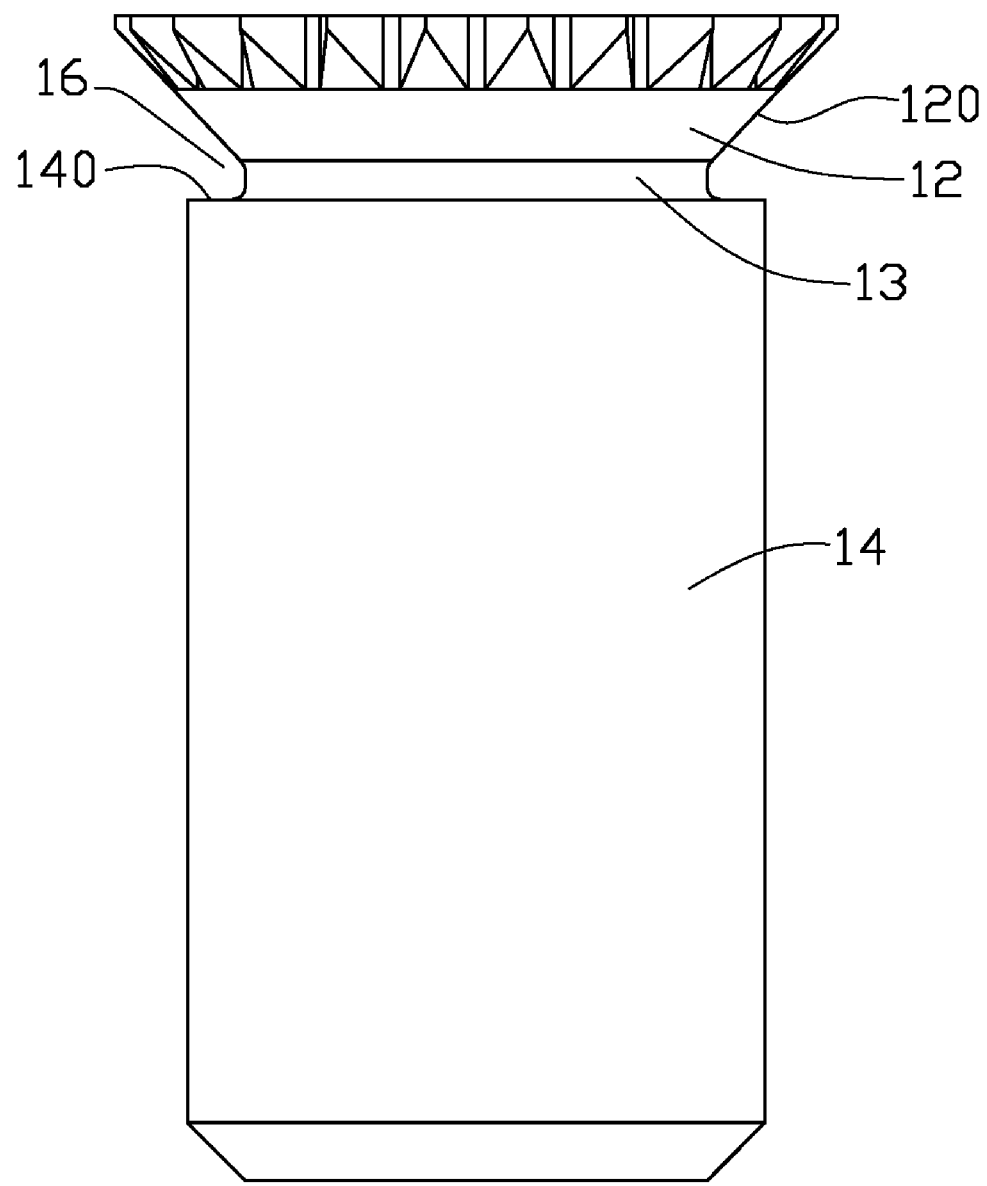
FIG. 2 a plan view of the connecting element of FIG. 1.

Referring to FIG. 2, the head 12 is tapered, with a diameter decreasing towards the neck portion 13. A plurality of pyramids extends radially from a circumference of a top of the head 12. In addition, a slanted circumference of the head 12 functioning as a guiding portion 120 is contoured to smoothly connect to the circumference of the neck portion 13. An angle between the guiding portion 120 and the neck portion 13 is substantially greater than 90 degrees in the instant embodiment.

The shaft 14 is substantially cylindrically-shaped. The shaft 14 includes a resisting portion 140 facing the neck portion 13 and surrounding the neck portion 13. The resisting portion 140 is perpendicular to the neck portion 13 in the instant embodiment. In addition, the resisting portion 140 is contoured at ends thereof to smoothly connect to the circumference of the neck portion 13. A diameter of the neck portion 13 is smaller than that of the shaft 14.

The guiding portion 120, the neck portion 13, and the resisting portion 140 cooperate to form a slot 16.

In use, the shaft 14 is inserted into a through hole defined in one object, and then, the head 12 is punched into the through hole. Therefore, in the movement, a part bounding the through hole of the object is squeezed into the slot 16 along the guiding portion 120, and resisted by the resisting portion 140 for preventing the object from disengaging from the connecting element 10. Obviously, the guiding portion 120 can guide the part of the object to smoothly slide into the slot 16, resulting in reducing friction and deformation. In addition, the slanted guiding portion 120 can enlarge a contact area between the object and the connecting element 10, therefore, stress formed between the object and the connecting element 10 in the slot 16 can be reduced.

In other embodiments, the connecting element 10 can be a screw, a bolt, or a rivet for joining the objects. In addition, a screw hole may also be defined in the connecting element 10 axially passing through the connecting element 10, for connecting with the other object.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A connecting element comprising:
   a tapered head with a plurality of pyramids extending radially from a circumference of a top of the head;
   a shaft; and
   a neck portion connected between the head and the shaft, wherein a diameter of the neck portion is smaller than that of the shaft;
   wherein a diameter of the head decreases towards the neck portion to form a slanted circumference functioning as a slanted guiding portion; the shaft comprises a resisting portion facing and connecting with the neck portion; the guiding portion, the neck portion, and the resisting portion corporately form a slot.

2. The connecting element of claim 1, the guiding portion is smoothly connected to the circumference of the neck portion.

3. The connecting element of claim 1, the resisting portion is smoothly connected to the circumference of the neck portion.

4. The connecting element of claim 1, wherein the distal end of the shaft defines a screw hole therein extending axially.

5. The connecting element of claim 4, wherein the screw hole is a through hole.

\* \* \* \* \*